United States Patent [19]

Eickman et al.

[11] Patent Number: 4,524,101
[45] Date of Patent: Jun. 18, 1985

[54] HIGH MODULUS POLYETHYLENE FIBER BUNDLES AS REINFORCEMENT FOR BRITTLE MATRICES

[75] Inventors: Nancy C. Eickman, Mountainside, N.J.; Walter Fabisiak, Easton, Pa.; Robert Dix, Wayne, N.J.

[73] Assignee: Celanese Corporation, New York, N.Y.

[21] Appl. No.: 635,103

[22] Filed: Jul. 27, 1984

Related U.S. Application Data

[62] Division of Ser. No. 464,269, Feb. 7, 1983, Pat. No. 4,483,727.

[51] Int. Cl.³ .................. C04B 31/34; D01G 1/04
[52] U.S. Cl. ........................... 428/294; 106/99; 428/296; 428/394
[58] Field of Search ........... 428/296, 288, 294, 359, 428/360, 357, 358, 402, 394; 106/99, 90, 111; 264/143, 163, 210.8; 19/0.6, 0.3, 0.58, 0.40, 0.46; 57/2; 83/913; 458/703

[56] References Cited

U.S. PATENT DOCUMENTS

| | | | |
|---|---|---|---|
| 2,830,327 | 4/1958 | Wildbolz | 19/0.6 |
| 2,969,301 | 1/1961 | Finger | 156/62 X |
| 3,050,298 | 8/1962 | Sumner | 57/2 |
| 3,086,252 | 4/1963 | Marley | 19/0.46 |
| 3,362,270 | 1/1968 | Meath et al. | 83/913 |
| 3,492,389 | 1/1970 | Port et al. | 264/147 |
| 3,921,874 | 11/1975 | Spain | 264/143 |
| 3,962,205 | 7/1976 | Ward et al. | 526/352 |
| 4,058,406 | 11/1977 | Raponi | 106/90 |
| 4,158,555 | 6/1979 | Kallenborian | 156/62 X |
| 4,224,377 | 9/1980 | Moens | 428/359 |
| 4,261,754 | 9/1981 | Krenchel et al. | 106/90 |
| 4,297,414 | 10/1981 | Matsumoto | 428/400 |
| 4,414,030 | 11/1983 | Restrepo | 106/99 |

Primary Examiner—Michael Ball
Attorney, Agent, or Firm—Burns, Doane, Swecker & Mathis

[57] ABSTRACT

A process for producing bundles of high modulus polyethylene fibers for reinforcement in composites wherein the matrix is a brittle material such as cement, concrete, plaster of Paris or the like. The process involves passing high modulus polyethylene yarn through high pressure nip rolls to deform the individual filaments and to form a loosely adhering unitary mass or bundle of filaments which is then chopped into short lengths for use as fibrous reinforcement in composites. In a preferred embodiment, the yarn is twisted prior to being passed through the nip rolls.

16 Claims, 4 Drawing Figures

HIGH MODULUS POLYETHYLENE FIBER BUNDLES AS REINFORCEMENT FOR BRITTLE MATRICES

This application is a division, of application Ser. No. 464,269, filed Feb. 7, 1983 now U.S. Pat. No. 4,483,727.

BACKGROUND OF THE INVENTION

1. Field of the Invention

The present invention relates to a process for forming bundles of high modulus polyethylene fibers, and more particularly, to bundles of such fibers which can be used as reinforcing agents for brittle matrices.

2. Description of the Prior Art

The use of various types of fibers for the reinforcement of brittle matrices is well-known in the prior art. For example, a paper entitled "Fibrous Reinforcement For Portland Cement" by S. Goldfein, "Modern Plastics" (April 1965), pages 156–159, discloses that the impact resistance and flexural strength of castings and moldings made from Portland cement mixtures can be improved by the addition of organic fibers such as nylon, polypropylene, and polyethylene fibers. As noted by Goldfein, the high pH of the cement slurry prevents the use of glass, cotton, rayon, acetate and Dacron (trademark of E. I. du Pont de Nemours & Co. for a polyester fiber made from polyethylene terephthalate). As noted by Goldfein, a limiting factor was the viscosity effect of the fibers on the cement. Nylon was limited to a maximum of about 3% whereas the other fibers could be used at quantities as high as 7%.

The difficulties in using such fibers as reinforcement are described in part in U.S. Pat. No. 3,591,395 to Zonsveld et al. As noted therein, the use of 3% by weight of nylon or 6% by weight of polypropylene would be economically prohibitive. Furthermore, the use of low denier monofilaments chopped into short lengths entails some technical difficulties. Such filaments are normally marketed wound on small diameter spools. A deformation of such filaments is thus generated which, after winding off, manifests itself as a tendency to curl. The resulting monofilaments of short lengths are therefore difficult to handle, since the fibers ball together and cannot be distributed evenly in a water-hardenable mass. Unraveling of the fibers, as mentioned by Goldfein in his paper, is a cumbersome and time-consuming operation which is commercially unacceptable.

In an attempt to solve this problem, Zonsveld et al advocate the use of 0.05 to 2% by weight of fibrous reinforcing elements formed from a stretched and then fibrillated plastic film material which is preferably polyolefin film. The Zonsveld et al patent contemplates the use of either continuous filaments or short segments of fibrillated plastic film material.

The same problem of the tendency of fibers to ball up in concrete products rather than being mixed uniformly is mentioned in Goldfein, U.S. Pat. No. 3,645,961. As stated therein, it is preferred that longer fibers be used since the strength increases with the length of the fibers, but that the difficulty of mixing increases at the same time. That is, as the length of the fibers is increased, there is a greater tendency of the mixture to ball.

In fact, this problem with the balling of fibers is sometimes employed to advantage to produce low density concretes which are referred to as "air-entrained" concretes and have an air content of up to about 10%. Thus, U.S. Pat. No. 3,679,445 to Howe describes the manufacture of such concretes, and suggests the use of fibers which are less than two inches long and usually range in length between about ⅛ inch and 1 and ⅛ inches. Included within the suggested fibers are those made from cotton, flax, rayon, Orlon (trademark of E. I. du Pont de Nemours & Co. for an acrylic fiber), nylon, Dacron (trademark of E. I. du Pont de Nemours & Co. for a polyester fiber made from polyethylene terephthalate), Terylene (trademark of Millhaven Fibers Limited for a polyester fiber based on terephthalic acid), polyethylene, polypropylene, polyvinyl chloride and glass. Although there are certain applications wherein such air-entrained concretes are desirable, such is not the case where structural support is needed.

As noted in Oya et al, U.S. Pat. No. 3,865,779, the hydrophobic properties of synthetic fibers when they are admixed with mortar, result in their being poorly dispersed in the mortar and being liable to float on the surface, which inevitably results in the product having nonuniform physical properties. Accordingly, Oya et al discloses a process for preparing reinforcing additives to be applied to inorganic cements which are prepared by combining certain polymers, inorganic materials or cement, and a surfactant; mixing and melting the mixture; and then extruding it into fibers of desired shapes. However, the extra steps involved in such a process severely limit its commercial viability.

Another method of mixing fiber reinforced concrete without the formation of fiber balls therein is disclosed in Dearlove et al, U.S. Pat. No. 4,823,706. The method includes the steps of depositing a uniform layer of substantially individual concrete reinforcing fibers on an elongated web, coiling the web to contain the fibers, locating the coiled web in proximity to a concrete mixing device, and progressively unrolling the web at a predetermined rate to discharge the layer of fibers therefrom into the mixture. The invention described therein is stated to be an alternative to specially designed fiber feeders which separate fiber balls found in a package of fibers and slowly feed individual fibers into a mixer or the like. However, both of these solutions entail the use of extra steps and equipment which have a deleterious effect upon the commercial value of the processes.

A number of patents disclose the use of fibers in various forms as reinforcement in composites which include brittle matrices. For example, Fischer et al, U.S. Pat. No. 3,533,203, describes the use of highly elastic multifilament polypropylene strands, twisted or untwisted, i.e., ropes or rovings, as the pretensioning element for precompressed concrete. After tensioning and holding such strands by clamps, concrete is poured around the tensioning strands and allowed to set while maintaining the strands under tension.

Suzukawa, U.S. Pat. No. 3,607,685, discloses a composite building laminant containing an inorganic cement reinforced with polypropylene multifilaments.

Reineman, U.S. Pat. No. 3,922,413, and Duff, U.S. Pat. No. 3,949,144, both disclose a concrete structural member comprising a plurality of alternate layers of epoxy resin containing concrete and fiber reinforced epoxy resin. The fiber reinforcement may be synthetic fibers woven in a basket-like weave. It should be noted that the fiber reinforcement is used in the epoxy resin layers and not in the concrete.

Downing et al, U.S. Pat. No. 4,240,480, discloses cementitious composites that may include synthetic organic polymer fibers, such as polypropylene fibers, in various forms, for example roving or fibrillated sheet, as reinforcement. The compositions are prepared by subjecting a mixture of hydraulic cement, fine aggregate, a selected water dispersable polymer and water to a homogenization process in order to substantially reduce voidage in the product, and then curing and drying the product. It should also be noted that in each of the examples therein, the ingredients are mixed in a mixer and extruded before being cured and dried. Such a process would not be suitable for forming large batches of material.

Accordingly, a need exists for fibers in a form in which they can be used as reinforcements in composites, wherein the fibers are readily mixed with a brittle matrix without the tendency to balling and air entrapment which results in the nonuniformity found in the prior art, or the use of expensive and complicated equipment to avoid such tendencies.

SUMMARY OF THE INVENTION

The present invention comprises the use of bundles of parallel or slightly twisted high modulus polyethylene fibers as reinforcement in composites wherein the matrix is a brittle material such as cement, concrete, plaster of Paris or the like. A yarn made up of individual filaments, with a modulus in excess of 300 grams per denier, is initially passed through high pressure nip rolls to deform the individual filaments and to form a loosely adhering unitary mass or bundle of filaments. This mas is then chopped into short lengths for use as fibrous reinforcement in composites. This process results in short lengths of fibers wherein the bundle configuration is substantially maintained. In a preferred embodiment, the yarn is twisted prior to being passed through the nip rolls.

The bundles of the present invention are particularly useful as reinforcement when brittle matrices are employed in forming thin architectural panels such as cladding panels and surface-bonded masonry, and are also useful for reinforcing asbestos/concrete piping.

DETAILED DESCRIPTION OF THE INVENTION

Figure 1:
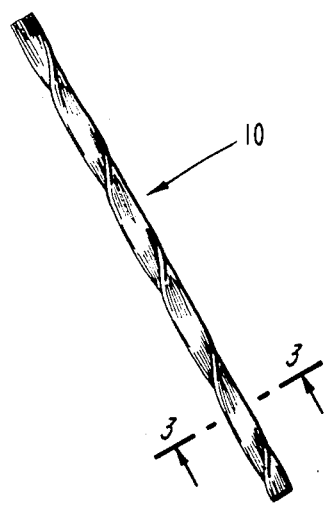
FIG. 1 is a perspective view of a typical bundle produced in accordance with a preferred embodiment of the process of the present invention.

The process of the present invention produces discrete coherent bundles of high modulus polyethylene fibers which are useful as reinforcing agents. The process comprises preparing highly oriented, multifilament yarn; compressing the yarn; and then chopping the compressed yarn into appropriate lengths. In the process of being compressed, the individual filaments are deformed in cross section such that adjoining filaments are also affected although the filaments are not fused together. This results in bundles which are readily mixed with various types of brittle matrices, which matrices typically include a relatively high proportion of an aqueous medium.

The yarn for use in the present process can be prepared by the procedures set forth in U.S. Pat. Nos. 3,962,205; 4,254,072; 4,268,470; and 4,287,149, all incorporated herein by reference. Those patents describe a process for preparing high modulus polymeric materials and the polymer materials produced thereby.

U.S. Pat. No. 4,254,072 issued to Capaccio et al, in particular, is directed to a process for the production of a high modulus filament of polyethylene which comprises heating high density polyethylene to a temperature above its melting point, extruding the polymer to form a filament, subjecting the filament immediately after extrusion to a tension under such conditions that the polymer is shaped without substantial orientation of its molecules, cooling the filament at a rate of cooling in excess of 15° C. per minute, and drawing the filament to a high draw ratio.

By "high density polyethylene" is meant a substantially linear homopolymer of ethylene or a copolymer of ethylene containing at least 95% by weight of ethylene having a density of from 0.85 to 1.0 g/cm$^3$ as measured by the method of British Standards Specification No. 2782 (1980) method 509B on a sample prepared according to British Standard Specification No. 3412 (1966) Appendix A and annealed according to British Standard Specification No. 3412 (1976) Appendix B(1), such as for example that produced by polymerizing ethylene in the presence of a transition metal catalyst. Preferred polymers have a weight average molecular weight of not more than 200,000.

Preferably the high density polyethylene has a weight average molecular weight of at least 50,000 and desirably a number average molecular weight in the range of 15,000 to 30,000. Desirably the polymer has a ratio of weight average molecular weight (Mw) to number average molecular weight (Mn) of less than 8:1.

The polymer is heated to a temperature above its melting point, preferably in the range 150° to 320° C., most preferably from 190° to 300° C., for example 230° to 280° C., and may be extruded at that temperature by any suitable means through a die or spinneret. Immediately after extrusion it is subjected to a tension under such conditions that the polymer is shaped by being drawn while hot without substantial orientation of its molecules, that is to say, the polymer retains a low degree of birefringence. Typically, the polymer has a birefringence of not more than $5 \times 10^{-3}$.

Tension may be applied to the extruded polymer by a forwarding device such as a forwarding jet of fluid, a roll or set of rolls, or a wind up device. The applied tension must not be excessive and must be sufficient to give filaments having a relatively low birefringence.

After leaving the spinneret, the polymer is cooled, for example, by natural cooling during its passage through air, or by quenching or contact with fluid, particularly a liquid. The rate of cooling in air is far in excess of 15° C. per minute and by quenching in a liquid, very high rates of cooling may be obtained. The high rate of cooling prevents excessive crystallization of the polymer which affects the subsequent drawing of the spun filaments. Preferably the quenching restricts the degree of crystallization in the filaments so that their density does not exceed a value of 0.96 g/cc.

The cooled polymer is drawn either immediately, as in a spin draw process, or may be stored in a convenient form and subsequently drawn. For example, the spun filament may be wound on a bobbin prior to drawing. In the drawing process the filament is drawn or stretched to a high draw ratio. In the present application, the "deformation ratio" or "draw ratio" is defined either as the ratio of the final length to the initial length, or as the ratio of the cross sectional areas before and after drawing.

The modulus of such a filament obtained at a high draw ratio, usually greater than 10:1, is primarily a function of the draw ratio, the birefringence of spun filament having very little effect. Preferably the draw ratio is at least 20:1.

The drawing performance of the spun filaments is also controlled by the temperature and the speed of the drawing. Sufficient heat should be supplied to the undrawn filaments to enable them to draw without breaking. Conveniently drawing may take place in a heated fluid, for example, a jet or bath of fluid especially a liquid, such as, for example, glycerol. Drawing may also be accomplished by bringing the fiber into contact with a heated surface such as a metal or ceramic hot shoe.

The draw temperature should never exceed a value of 130° C., otherwise the filaments tend to melt and are flow drawn which does not result in the filaments developing a high modulus. On the other hand, the draw temperature should not fall below 90° C., otherwise the drawing process becomes unrunable due to an excessive number of breakages in the thread line.

Spun filaments of polyethylene having a weight average molecular weight of not more than 200,000, a birefringence of not more than $5 \times 10^{-3}$, and a density of not more than 0.96 g/cc may be drawn at a temperature in the range of 90° C. to 130° C. in a single stage to a draw ratio in excess of 20:1 at a draw speed of at least 200 ft per minute.

While the drawing operation can be performed either as a single stage operation or a plurality of stages, it is preferred that either a double stage or triple stage process be used, and it is particularly preferred that a triple stage process be used. By using a triple stage hot drawing system, it is possible to achieve a maximum draw ratio as high as 50:1, thereby providing a maximum modulus value of 923 grams per denier. It appears that with increasing draw ratio, proportional increases in modulus and tenacity and decreases in elongation are seen.

Particularly in the triple-stage drawing process, it is preferred that the yarn which is to be drawn be composed of individual filaments of about forty-five denier per filament or less. When using higher denier yarns (50–90 dpf) a reduction in the overall draw ratio is found which is accompanied by lower physical properties. For such a triple stage drawing process, the initial draw ratio is about 12:1 followed by stages having draw ratios of about 1.66:1 and 1.5:1 to produce an overall total draw ratio of 30.0:1.

Typical average tensile properties for the yarn utilizing the process of the present invention which has been drawn to a draw ratio of about 30:1 are a tenacity of 8 grams per denier, an elongation of about 10% and a modulus of about 500 grams per denier. Preferably for a draw ratio of between about 20:1 and about 50:1, a tenacity of between about 8 gpd and about 12 gpd, an elongation of between about 25% and about 5%, and a modulus between about 300 gpd and about 900 gpd will be seen.

The tenacity (gpd), elongation (%), and modulus (gpd) are measured on single filaments at 72% relative humidity and 25° C. on an Instron Tester (Instron Engineering Corporation, Canton, Mass.) using a constant extention ratio of 20% per minute with a gauge length of 1 inch and using the standard test methods described in Section D2101-79 of the Book of ASTM Standards. The terms "tenacity", "elongation", and "modulus" are also defined therein. In particular, modulus is defined as the ratio of the change in stress to the change in strain in the initial straight line portion of the stress-strain curve.

The compressing of the drawn yarn may be performed by passing the yarn through a set of nip rolls using any of the various apparatus well known to those skilled in the art. The exact pressure applied to the yarn by the nip rolls is not critical, the determining factor being that the pressure must result in substantial deformation of the individual filaments. Typical pressure applied by the nip rolls will be between about 10 and about 300 psi.

While not being absolutely essential, it is preferred that the yarn be twisted prior to being compressed. Such twisting can be done by any of the apparatus well known to those skilled in the art. While any twist will assist in the maintenance of discrete coherent bundles after the chopping operation, it is preferred that the yarn be twisted between about one and about five turns per inch. It is particularly preferred that a twist of about 2 and ½ turns per inch be applied.

After passing through the nip rolls, the compressed yarn is chopped into bundles having a length between about 0.5 and about 2.5 inches. The particular length used in not critical and will be chosen depending upon the brittle matrix which is being reinforced. However, the longer the bundles, the more likely that the balling problem of the prior art will be encountered. Accordingly, using bundles within the preferred range will tend to decrease this possibility.

The size of the bundles used can vary between about 200 yarn denier and about 3,000 yarn denier, with a 1,500 denier bundle giving the best combination of workability and property enhancement of a brittle matrix.

When using a yarn as small as 200 yarn denier in preparing the bundles of the present invention, the resulting sample is extremely fluffy. Accordingly, as this lower limit is approached, it becomes more difficult to produce a bundle which is readily mixed with a brittle matrix.

The number of filaments making up the yarn used in the present process can vary over a wide range from about 200 filaments to about 3,000 filaments of between about 0.5 and about 2 denier per filament. A preferred range is between about 700 filaments and about 3,000 filaments, at approximately one denier per filament.

After chopping has been completed, the chopped yarn is in the form of discrete bundles. In contrast to the prior art, such bundles are capable of being manually introduced into a cement mixer where they can be uniformly dispersed without further procedures.

At least in part the bundles are maintained in a discrete form due to the ends of the individual filaments being partially fused by the chopping operation. When combined with the step of passing the yarn through the nip rolls wherein the fibers are deformed and compressed in such a manner that the yarn almost resembles a twisted fibrillated tape, discrete coherent bundles are formed.

If care is not taken in the compression operation, the bundles will be small bits of fluff which are fused at the end although the material between the points will be open. However, this tendency is almost entirely suppressed by twisting the yarn prior to the chopping operation.

The cross-sectional geometry of the fibers used in preparing the yarn is not critical, with trilobal cross-sectional fibers processing comparably to round cross-sectional fibers. The particular shape is not as important as the ability of the individual fibers to conform to the shape of the other fibers upon compression without leaving a large portion of void space.

By "brittle matrix" in the present application is meant a material which is weak in tension and particularly susceptible to breakup under impact. For example, cement and concrete crack at a very low strain of 0.04% or less. Other typical types of brittle matrices are plaster of Paris and mortar.

Loading the bundles of the present invention into a brittle matrix typically results in a rapid increase in viscosity. For example, a fiber loading of two volume percent added to concrete resulted in a mix which was very stiff and unworkable and required the addition of more water to reach the desired slump (a measure of workability defined in ASTM test method C143). Accordingly, when using the bundles of the present invention, it may be necessary to modify the mix proportions, i.e. water:cement ratio and the cement:sand:aggregate ratio, to compensate for this effect.

One of the applications in which the bundles of the present invention are used advantageously, is in the reinforcement of thin architectural panels such as cladding panels and surface-bonded masonry which are typically made from brittle matrices. The bundles are also useful for reinforcing asbestos/concrete piping.

FIG. 1 is a perspective view of a typical bundle 10 produce in accordance with the preferred embodiment of the present invention. The bundle seen in FIG. 1 is about one inch long and thus a twist of about 2.5 turns is seen. This twist was imparted prior to the yarn being passed through the nip rolls, and the twist is substantially maintained in the bundles as formed.

Figure 2:
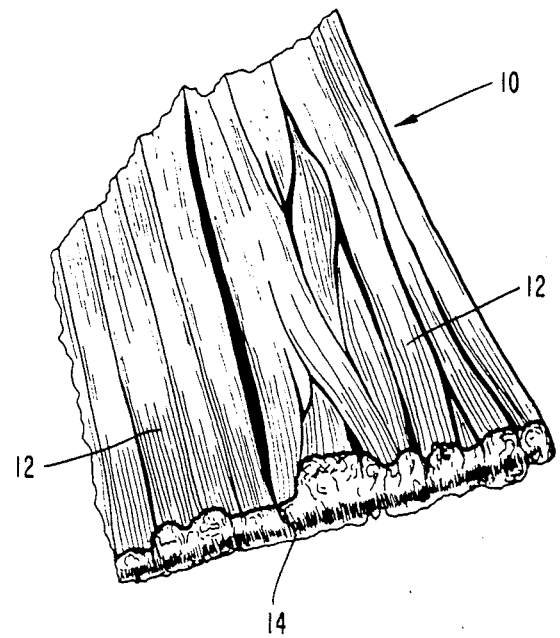
FIG. 2 is an enlarged perspective view of the end of a typical bundle of the present invention illustrating the partial fusing of the end which occurs as the compressed yarn is chopped into appropriate lengths.

FIG. 2 is an enlarged view of the end of a typical bundle of the present invention. As can be seen in FIG. 2, the individual filaments 12 are partially fused at the end 14 of the bundle 10 by the chopping operation. This tends to keep the individual filaments 12 from separating until being mixed into a brittle matrix.

Figure 3:
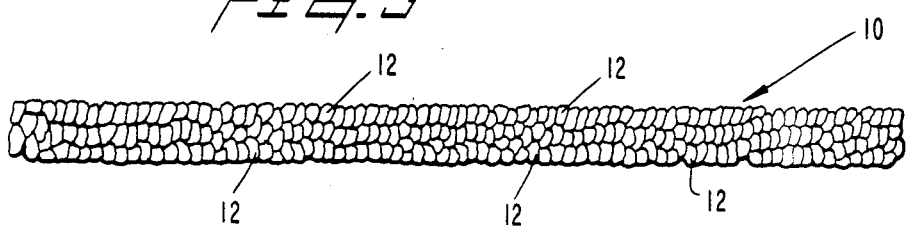
FIG. 3 is an enlarged cross section of the bundle of FIG. 1 taken on the line 3—3.

FIG. 3 is an enlarged cross section of a portion of the bundle of FIG. 1 taken on the line 3—3. Individual filaments 12 are readily seen, and it can be observed that the individual filaments 12 retain their individual identity in spite of the compressing step.

At the same time, it can also be seen in FIG. 3 that the individual filaments 12, which were originally round, have been deformed and flattened by the compressing step such that each filament 12 now substantially conforms to the deformed shape of the surrounding filaments 12. In fact, the bundle 10 is in the nature of a fibrillated tape if an attempt is made to pull the bundle 10 apart.

Figure 4:
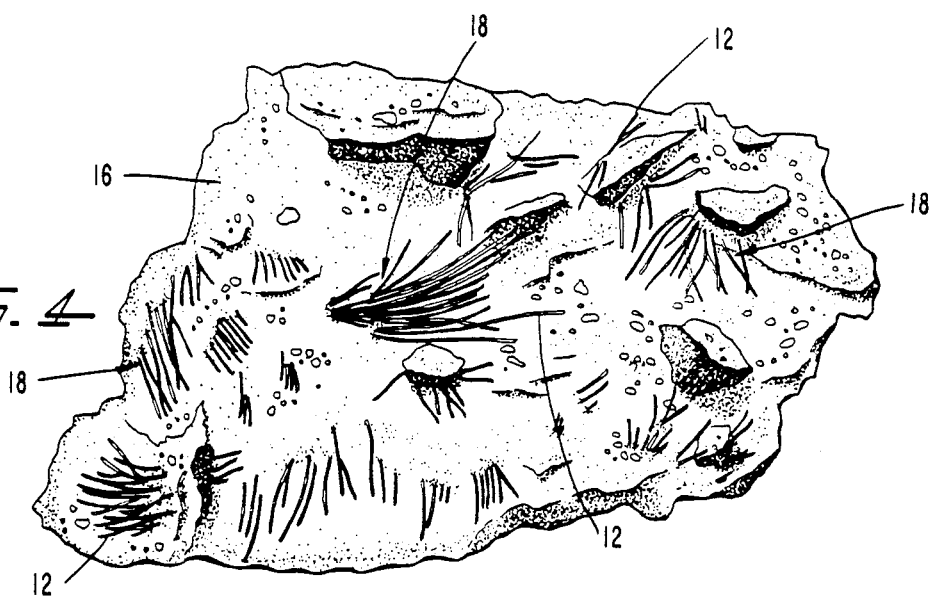
FIG. 4 is a perspective view of a piece of concrete containing the bundles of the present invention which has been broken to illustrate how the fibers in the bundles of the present invention become dispersed when mixed in a brittle matrix and to illustrate the reinforcing properties of the bundles of the present invention when dispersed in a typical brittle matrix prior to curing.

FIG. 4 is an enlarged perspective view of a piece of concrete containing the bundles of the present invention. The piece has been broken to illustrate how the bundles appear after being incorporated in a brittle matrix and to illustrate the reinforcing properties of the bundles when they have been dispersed prior to curing.

Within concrete 16 are seen numerous bundles 18 which serve to reinforce the piece of concrete. As can be seen, the bundles 18 protrude at varying lengths from the broken surface of the piece of concrete. As can be further seen in FIG. 4, when the bundles 10 are mixed into a brittle matrix, such as concrete 16, the mixing action tends to separate the individual filaments 12. The reinforcing pattern is typical of that seen when 2% by volume of the bundles is used.

In order to further illustrate the present invention and the advantages thereof, the following specific example is given, it being understood that this example is intended to illustrate the invention but is not intended to act as a limitation on the scope of the present invention.

EXAMPLE

High density polyethylene having a number average molecular weight of about 22,000 and a weight average molecular weight of about 60,000 (Alathon 7050, a trademark of E. I. du Pont de Nemours & Co. for a polyethylene resin) was produced using a 19 hole spinneret. The spinning conditions were a spinneret temperature of 280° C., a throughput of 15 g/min., and a takeup speed of 160 m/min. A conventional pack arrangement was used with 60/80 sand as a filtering media. The resulting filaments as spun had a dpf of approximately 45 and a birefringence of 0.0045. A static air quench was used.

The spun yarn was drawn in three stages to a final draw ratio of 45:1. The intermediate draw ratios in the three stages were 12:1, 2.5:1, and 1.5:1 and were accomplished by bringing the yarn into sliding contact with hot shoes maintained at 120° C. The fiber properties of the resulting yarn were a modulus of about 900 grams per denier, a tenacity of about 10 grams per denier, and an elongation of about 8%.

The resulting yarn was twisted about 2.5 turns per inch and was then fed through nip rolls which applied a pressure of 60 psi. A fiber chopper cut the compressed yarn into bundles of about one inch using nip rolls and a chopper manufactured by Precision Cutters, Inc., Alpha, N.J.

The resulting bundles were introduced at 2% by volume into a cement having a water:cement ratio of 1:3.3 and a cement:sand ratio of 3.3:1. The resulting mixture was mixed until the bundles had been relatively uniformly dispersed, and then the mixture was formed into a cladding panel. A comparison was made between a cladding panel having the reinforcement of the present invention and an unreinforced panel.

The panels were tested using the procedures described in the ASTM test method C348 to determine their flexural strength. The flexural strength of the reinforced panel was 1,760 psi compared to a flexural strength of 945 psi for the unreinforced panel.

While the invention has been described in various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A discrete, coherent bundle of high modulus polyethylene fibers prepared by the process comprising:
   (a) preparing highly oriented, multifilament yarn;
   (b) compressing the yarn to deform the individual filaments in cross-section whereby a loosely adhering unitary mass of individual filaments is formed wherein each filament substantially conforms to the deformed shape of the surrounding filaments; and
   (c) chopping the compressed yarn into bundles of appropriate lengths wherein there is at least partial fusion between the fiber ends during said chopping.

2. A reinforced brittle matrix comprising a reinforcing amount of the bundles of claim 1, substantially uniformly dispersed in a brittle matrix.

3. The reinforced matrix of claim 2 in which the brittle matrix is concrete, cement, plaster of Paris, or mortar.

4. The reinforced matrix of claim 2 which has been cast as a thin architectural panel.

5. A discrete, coherent bundle of high modulus polyethylene fibers of claim 1 wherein the yarn was compressed by passing through a set of nip rolls.

6. A reinforced brittle matrix comprising a reinforcing amount of the bundle of claim 5, substantially uniformly dispersed in a brittle matrix.

7. The reinforced matrix of claim 6 in which the brittle matrix is concrete, cement, plaster of Paris, or mortar.

8. The reinforced matrix of claim 6 which has been cast as a thin architectural panel.

9. A discrete, coherent bundle of high modulus polyethylene fibers of claim 1 wherein the yarn was twisted prior to being compressed.

10. A reinforced brittle matrix comprising a reinforcing amount of the bundle of claim 9, substantially uniformly dispersed in a brittle matrix.

11. The reinforced matrix of claim 10 in which the brittle matrix is concrete, cement, plaster of Paris, or mortar.

12. The reinforced matrix of claim 10 which has been cast as a thin architectural panel.

13. A discrete, coherent bundle of high modulus polyethylene fibers of claim 1 wherein the yarn was twisted between about one and five turns per inch prior to being compressed.

14. A reinforced brittle matrix comprising a reinforcing amount of the bundles of claim 13, substantially uniformly dispersed in a brittle matrix.

15. The reinforced matrix of claim 14 in which the brittle matrix is concrete, cement, plaster of Paris, or mortar.

16. The reinforced matrix of claim 14 which has been cast as a thin architectural panel.

* * * * *